March 3, 1964

E. C. EVANS 3,123,786

LOAD PROTECTOR COMPRISING AN AIR GAP SHUNTED
BY A CORE HAVING A SECONDARY WINDING

Filed Nov. 6, 1961

INVENTOR.
ELMER C. EVANS

BY

ATTORNEYS

United States Patent Office 3,123,786
Patented Mar. 3, 1964

3,123,786
LOAD PROTECTOR COMPRISING AN AIR GAP SHUNTED BY A CORE HAVING A SECONDARY WINDING
Elmer C. Evans, 7976 Lemon Circle, La Mesa, Calif.
Filed Nov. 6, 1961, Ser. No. 150,602
2 Claims. (Cl. 336—155)
(Granted under Title 35, U.S. Code (1952), sec. 266)

The invention described herein may be manufactured and used by or for the Government of the United States of America for governmental purposes without the payment of any royalties thereon or therefor.

This invention pertains to electrical translating apparatus for protecting alternating-current loads.

Often protective devices such as fuses and circuit breakers do not have fast enough response times to adequately protect an electrical load. For example, electrical meters although protected with special instrument-type fuses, are often burned out when the incorrect meter scale is used or a transient signal is applied.

It is an object of this invention to provide fast response protection for an alternating-current electrical load when an excessive supply voltage occurs.

It is an advantage of the invention that the load protective device may be readily adjusted to accommodate a variety of different loads.

It is a further advantage of the instant invention that it is entirely passive and requires no external control voltages or currents.

Other objects and advantages of the invention will be apparent from a study of the following specifications, read in connection with the accompanying drawings. It is to be expressly understood, however, that the drawings are for the purpose of illustration and description only, and are not intended as a definition of the limits of the invention.

Figure 1:
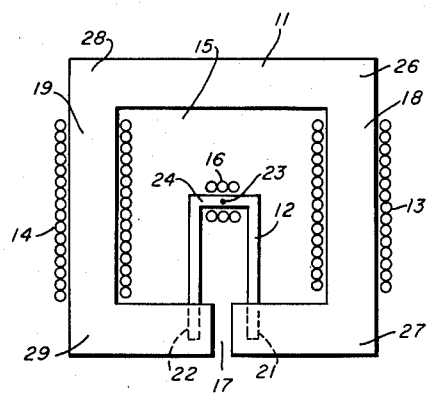
FIG. 1 is a schematic diagram of load protective apparatus in accordance with the invention.

The apparatus shown in FIG. 1 is equipped with a rectangular transformer core 11 of material that exhibits ferromagnetic properties. The core is preferably built up of laminations of ferromagnetic material that are insulated from one another. An air gap 17 is located in the center of one leg of the core and is disposed at a right angle to the leg. Identical primary windings 13 and 14 are respectively disposed on legs 18 and 19 of the core. A three-leg core 12 is disposed in window 15 of core 11. The core is preferably constructed of U-shaped laminations of a ferromagnetic material which are stacked one above the other. Ends 21 and 22 of core 12 are fixedly embedded in the one leg of core 11. Core 11 may be cut away to accept the ends of core 12, or if both cores are laminated, the laminations of core 12 may be interleaved between the laminations of core 11. Windings 13 and 14, when energized, produce a magnetic field in window 15 of core 11. The magnetic field contains flux lines going in a number of different directions. A neutral zone exists in the field wherein every flux line pointed in one direction is counteracted by a flux line pointed in the opposite direction. As a result there exists at this zone a magnetic null region where the magnetic flux is balanced and the net magnetic field strength is zero or negligible. Due to the symmetry of core 11 (ignoring air gap 17), and windings 13 and 14 about the center of window 15, this neutral zone is positioned at the center of the window. A secondary winding 16 is disposed on leg 24 of core 12. Core 12 and winding 16 are positioned so that the centerpoint 23 of winding 16 coincides with the magnetic null region.

Different materials are used for cores 11 and 12. A magnetic material with a high saturation induction is used for core 11. The saturation induction must be sufficiently high to prevent saturation of the core during normal and overload operating conditions. A ferromagnetic material with a low saturation induction is used for core 12. The magnetization curve of this material should preferably be linear under the saturation plateau, and the plateau should be linear and horizontal so that saturation can be reached abruptly. For example, if core 11 be of silicon steel, then core 12 could be of such material as Mumetal which consists of 77.2% nickel, 4.8% copper, 1.5% chromium and 16.5% iron and is manufactured by Allegheny Ludlum Steel Corporation. Another ferromagnetic material with a low saturation induction is Permalloy, which consists of substantially 78.5% nickel and 21% iron and is distributed by Western Electric Company.

Figure 2:
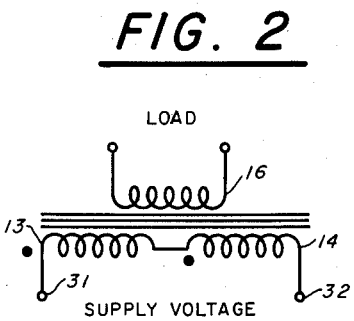
FIG. 2 illustrates schematically how the apparatus of FIG. 1 is connected to a load.

FIG. 2 discloses the electrical connections of the windings embodied in the transformer apparatus of FIG. 1. Primary windings 13 and 14 are connected in series aiding each other. The ends of the series-coupled windings terminate in input terminals 31 and 32. The ends of secondary winding 16 terminate in output terminals 33 and 34.

In operation, an alternating-current supply voltage is applied to input terminals 31 and 32 and a load that is to be protected from voltage surges is connected to output terminals 33 and 34. When the supply voltage is applied to the primary windings, the current in the windings produces a magnetomotive force which causes magnetic flux to flow in the cores and in the air. Flux encircles the windings and creates a magnetic pole at each corner of core 11. The polarity of the poles alternate at the frequency of the current applied to the primary. If a north pole is created at one corner of the core, for example, corner 26, south poles are created at adjacent corners 27 and 28 and another north pole is created at corner 29. The core and the air surrounding the core provides magnetic circuits for the flux, and flux lines link each adjacent pair of poles. The flux near the center region of window 15 linking the poles at corners 26 and 28 opposes and neutralizes the flux linking the poles at corners 27 and 29. Similarly the flux in the center of the window linking the poles at corners 26 and 27 neutralizes or counterbalances the flux linking the poles at corners 28 and 29. As a result, a neutral zone or magnetic "null region" exists in the center region of the window. The secondary winding 16 which is disposed in the center region of the window is thus affected by the flux in the core 12 and affected a negligible amount if any, by the leakage flux in the air.

Flux flowing in core 11 as a result of the magnetic force created by the current in windings 13 and 14 tends to bypass air gap 17 and flow around core 12 since core 12 has far less reluctance than air gap 17. The flux flowing in core 12 induces in winding 16 a voltage the magnitude of which is dependent on the ratio between the turns in the sum of the primary windings and the turns in the secondary winding. Of course, the turns ratio may be such as to produce a load voltage which is less than, equal to or greater than the supply voltage. Under normal operation the core 12 may be saturated or unsaturated with magnetic flux. When an above-normal voltage is temporarily or permanently applied to input terminals 31 and 32 more magnetizing current will flow in the primary windings and more magnetic flux will flow in core 11. This flux will saturate core 12, if it is not saturated already, and will flow across air gap 17. Even with a changing flux density in the window of core 15, winding 16 will remain in a magnetic null region, being affected by the flux in core 12 rather than by the leakage flux in the surrounding air. Once core 12 saturates, the voltage induced in winding 16 will remain constant and the load will not be subjected to a voltage which increases in proportion to supply voltage surges.

It is an advantage of the instant invention that primary burn-outs are reduced when supply voltage surges occur. Attempts have been made to employ a transformer with the primary and secondary windings on a common core which saturates under normal operation. This type of transformer is unsatisfactory as it is subject to primary burn-out when overloads are placed on the primary. The core normally operates at saturation induction. The magnetic flux cutting the primary winding is a maximum before an overload voltage is impressed so that the primary inductance and the induced E.M.F. in the primary can not increase magnitude when an overload occurs. With an insufficient induced E.M.F. to counteract the applied voltage excessive current flows in the primary winding and the primary is often opened. On the contrary, core 11 does not saturate even when the primary is subjected to an above-normal voltage and the supply voltage is counteracted by an above-normal induced counter-E.M.F. which limits the primary current.

Figure 3:
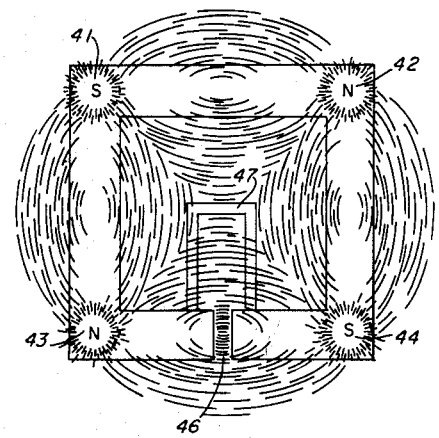
FIG. 3 represents diagrammatically the magnetic field produced by the apparatus of FIG. 1.

FIG. 3 schematically shows the magnetic field produced by the apparatus of FIG. 1 when it is operating. Magnetic pole regions 41, 42, 43 and 44 coincide with corners 28, 26, 27 and 23, respectively. Short horizontal flux lines 46 bridge air gap 17. Magnetic null region 47 is disposed between poles 42 and 43 and between poles 41 and 44. The null region coincides with the location of secondary winding 16.

Figure 4:
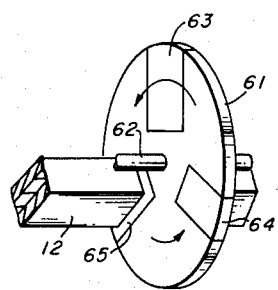
FIG. 4 is an isometric view of another embodiment in accordance with the invention.

The apparatus shown in FIG. 4, is equipped, according to an additional feature of the invention, with a device for changing the saturation induction of the core supporting the secondary winding. Planar frame 61 is supported by and rotatable with axle 62. Frame 61 is made of non-magnetic material and supports ferromagnetic members 63, 64 and 65. Each member has a different saturation induction and one that is low relative to the saturation induction of core 11. The saturation induction of one member may match the saturation induction of core 12. One leg of core 12 is cut so as to leave a gap wide enough to accept frame 61 and members 63 to 65. Frame 61 is rotated until one of the ferromagnetic members is aligned with the leg of core 12. In FIG. 4 member 65 is aligned with a leg of core 12. As a ferromagnetic member is placed in series with the magnetic circuit formed by core 12, core 12 can not saturate until the member saturates. Thus, the maximum voltage that can be induced in the secondary winding is controlled by the saturation induction of the ferromagnetic member inserted in core 12 and the member can be changed at will by rotating frame 61. If, for example, the load attached to output terminals 33 and 34 is a meter, the meter can be protected at one of three different voltage levels depending on which ferromagnetic member is inserted in core 14.

The invention is not limited to the particular details of construction and materials described above. It should be appreciated that core 11 may take other shapes, for example, an O-shaped core may be employed. Similarly, the number of separate primary windings may vary. The cores need not be laminated, and they may be made, for example, from molded ferromagnetic ceramics. The magnetic null region and the location of the secondary winding may be determined by observing the field pattern produced by the primary windings. The field may be observed by placing a flat non-magnetic sheet over the core and energized primary windings and sprinkling iron filings onto the sheet. The filings will orient themselves in accordance with the flux lines of the field.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An electrical load protector comprising a first core having a substantially closed loop of ferromagnetic material defining a window, a primary coil comprising first and second windings, said first and second primary windings being connected in series and so spaced apart on said first core as to produce within said window a region of substantially zero magnetic field, said core having an air gap, a second core of ferromagnetic material, said second core being C-shaped and having first and second ends, the ends of said second core being, respectively, in good magnetic contact with said first core on opposite sides of said air gap, a secondary winding disposed on said second core, said secondary winding being positioned substantially in said region of zero field, and said first core having a saturation induction higher than the saturation induction of said second core.

2. In a transformer for protecting an electrical load from supply voltage surges, a first core having a plurality of legs to define a window, one of said legs being laterally cut so as to form an air gap therein, a primary winding comprising first and second windings of substantially equal inductance serially connected, said windings being disposed on opposite legs of said core, a second core of ferromagnetic material having three legs and two ends, said second core having a saturation induction less than the saturation induction of said first core, said ends of said second core being fixed to said one core leg, said ends of said second core being positioned closely adjacent opposite sides of said air gap, and a secondary winding disposed on one of said legs of said second core and positioned in the region within said window where the magnetic field is minimum.

References Cited in the file of this patent

UNITED STATES PATENTS

| | | |
|---|---|---|
| 400,515 | Thomson | Apr. 2, 1889 |
| 2,466,028 | Klemperer | Apr. 5, 1949 |
| 3,047,846 | Koscheleff | July 31, 1962 |

FOREIGN PATENTS

| | | |
|---|---|---|
| 814,942 | Great Britain | June 17, 1959 |